(12) United States Patent
Lee

(10) Patent No.: US 9,896,988 B2
(45) Date of Patent: Feb. 20, 2018

(54) THREE WAY CATALYTIC CONTROL METHOD AND SYSTEM FOR DECREASING FUEL CONSUMPTION AND VEHICLE HAVING THE SAME

(71) Applicant: Hyundai Motor Company, Seoul (KR)

(72) Inventor: Sang-Min Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 20 days.

(21) Appl. No.: 15/281,545

(22) Filed: Sep. 30, 2016

(65) Prior Publication Data

US 2017/0167345 A1 Jun. 15, 2017

(30) Foreign Application Priority Data

Dec. 10, 2015 (KR) .................. 10-2015-0175687

(51) Int. Cl.
*F01N 3/00* (2006.01)
*F01N 3/02* (2006.01)
(Continued)

(52) U.S. Cl.
CPC ............ *F01N 9/00* (2013.01); *F01N 3/0864* (2013.01); *F01N 3/0885* (2013.01); *F01N 3/101* (2013.01);
(Continued)

(58) Field of Classification Search
CPC ...... F01N 3/0864; F01N 3/0885; F01N 3/101; F01N 3/22; F01N 3/30; F01N 9/00;
(Continued)

(56) References Cited

U.S. PATENT DOCUMENTS 7,905,087 B2 * 3/2011 Goebel .............. B01D 53/9431
60/286
2002/0155039 A1* 10/2002 Itoh .......................... F01N 3/021
422/171

(Continued)

FOREIGN PATENT DOCUMENTS

| JP | 2002-115581 A | 4/2002 |
| JP | 2005-171774 A | 6/2005 |
| JP | 2005-264751 A | 9/2005 |
| JP | 2008-111351 A | 5/2008 |
| JP | 2010-138767 A | 6/2010 |

(Continued)

*Primary Examiner* — Patrick Maines
*Assistant Examiner* — Dapinder Singh
(74) *Attorney, Agent, or Firm* — Mintz Levin Cohn Ferris Glovsky and Popeo, P.C.; Peter F. Corless

(57) ABSTRACT

A three-way catalytic control method for reducing fuel consumption is provided. The method includes determining whether oxygen storage capacity of the three-way catalyst is under condition of increasing oxygen, when condition of performing $O_2$ purge control for the three-way catalyst is detected and performing $O_2$ purge control by applying a predetermined $O_2$ purge time period to which a set initial value of oxygen of OSC is applied, when the OSC is not under the condition of increasing oxygen. The $O_2$ purge control is performed by applying $O_2$ purge time period for a deteriorated product based on an oxygen sensor or $O_2$ purge time period for on board diagnosis, when an increase amount of the calculated $O_2$ purge time period is equal to or greater than the $O_2$ purge time period for the deteriorated product during the $O_2$ purge control.

16 Claims, 6 Drawing Sheets

(51) Int. Cl.
- *F01N 3/10* (2006.01)
- *F01N 3/20* (2006.01)
- *F01N 9/00* (2006.01)
- *F01N 3/08* (2006.01)
- *F01N 3/22* (2006.01)
- *F01N 3/30* (2006.01)

(52) U.S. Cl.
CPC ............... *F01N 3/22* (2013.01); *F01N 3/30* (2013.01); *F01N 2560/025* (2013.01); *F01N 2900/1624* (2013.01); *Y02T 10/22* (2013.01); *Y02T 10/47* (2013.01)

(58) Field of Classification Search
CPC ....... F01N 2560/025; F01N 2900/1624; Y02T 10/24; Y02T 10/48
USPC ........................... 60/274, 277, 286, 295, 299
See application file for complete search history.

(56) References Cited

U.S. PATENT DOCUMENTS

2005/0028517 A1\* 2/2005 Nakagawa ............... F01N 3/101
60/285
2010/0108046 A1\* 5/2010 Nakagawa .......... F02D 41/1455
123/674

FOREIGN PATENT DOCUMENTS

| JP | 2014-062497 A | 4/2014 |
| KR | 10-1480566 B1 | 1/2015 |
| KR | 10-2015-0071580 A | 6/2015 |

\* cited by examiner

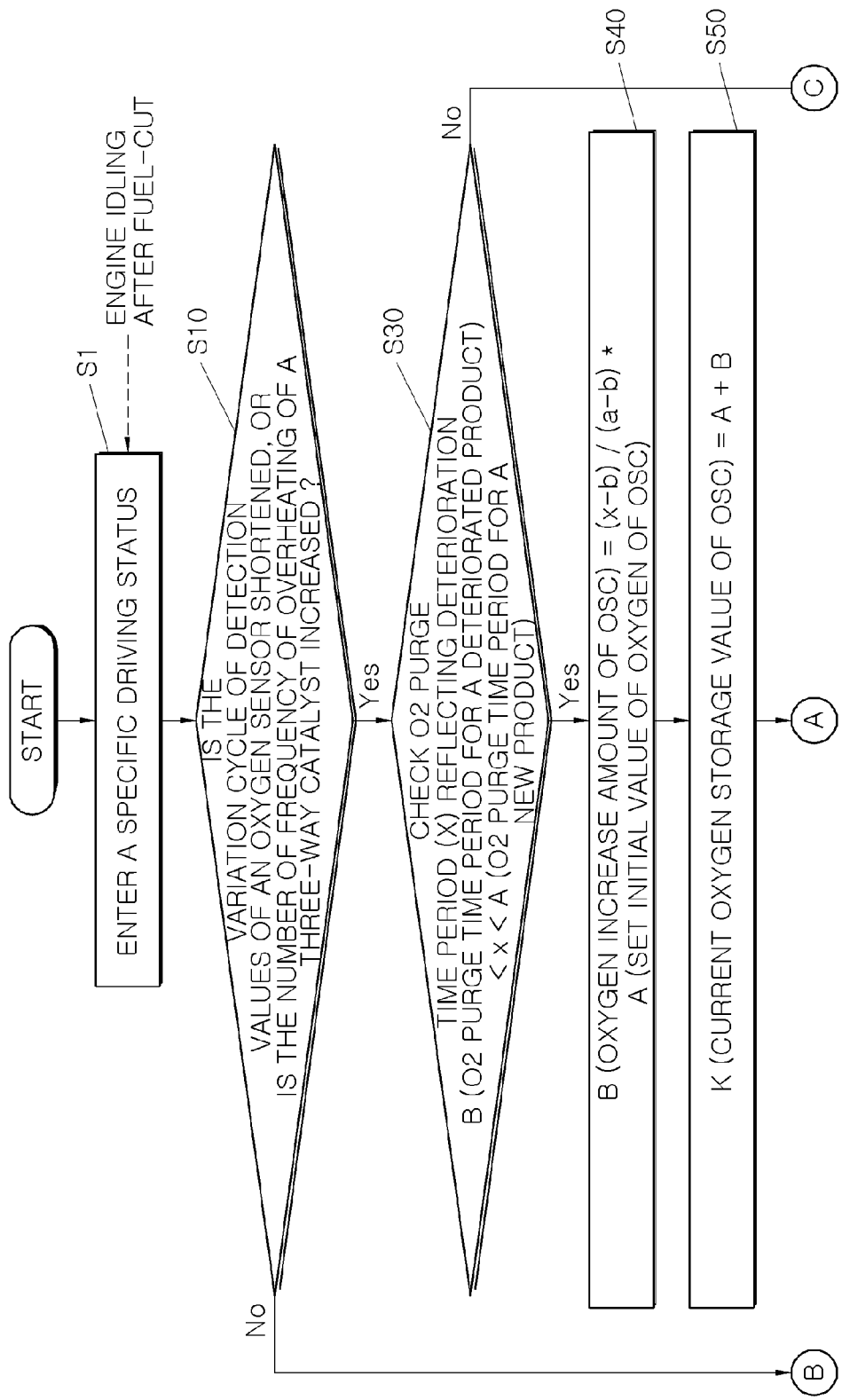

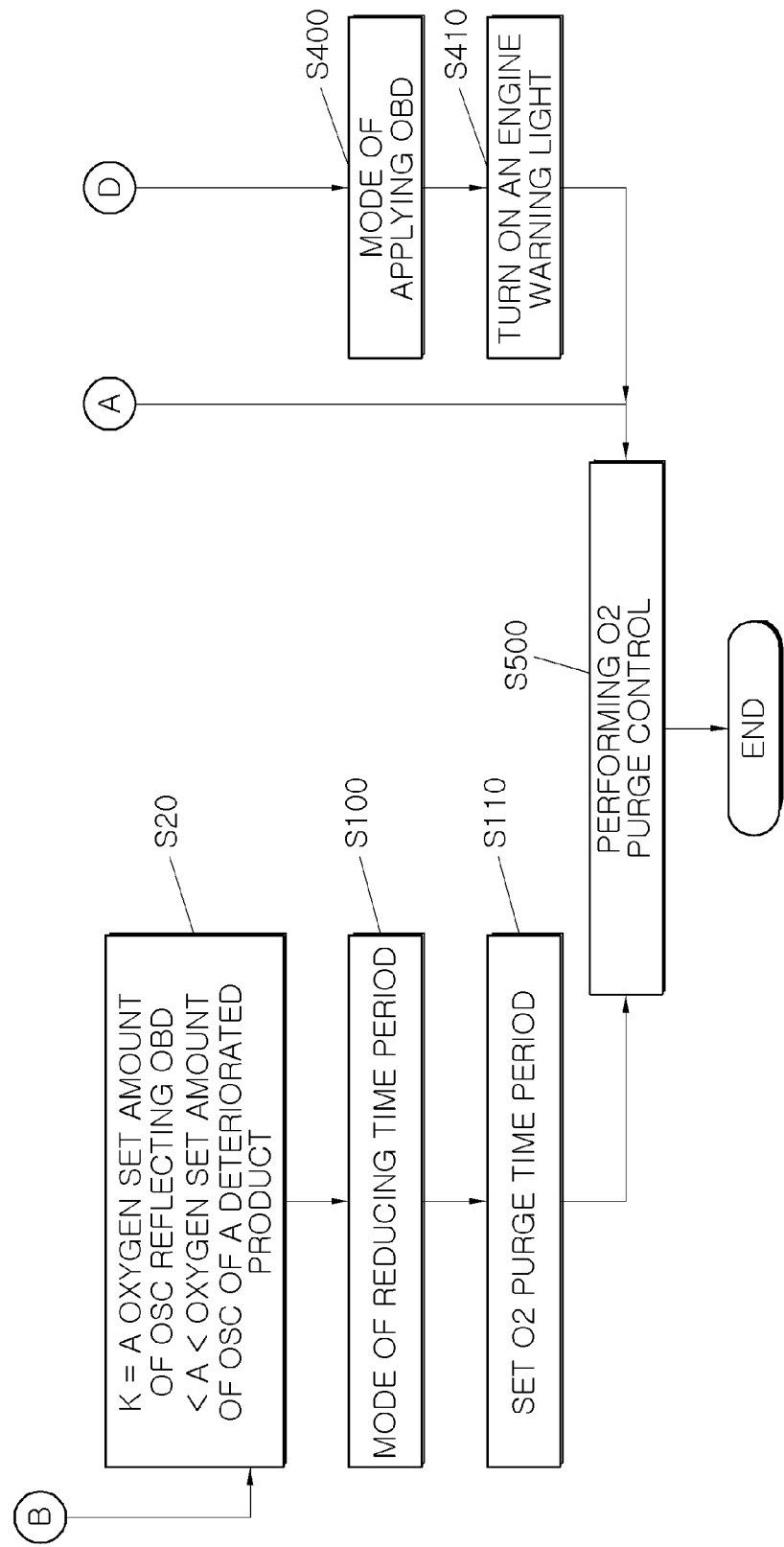

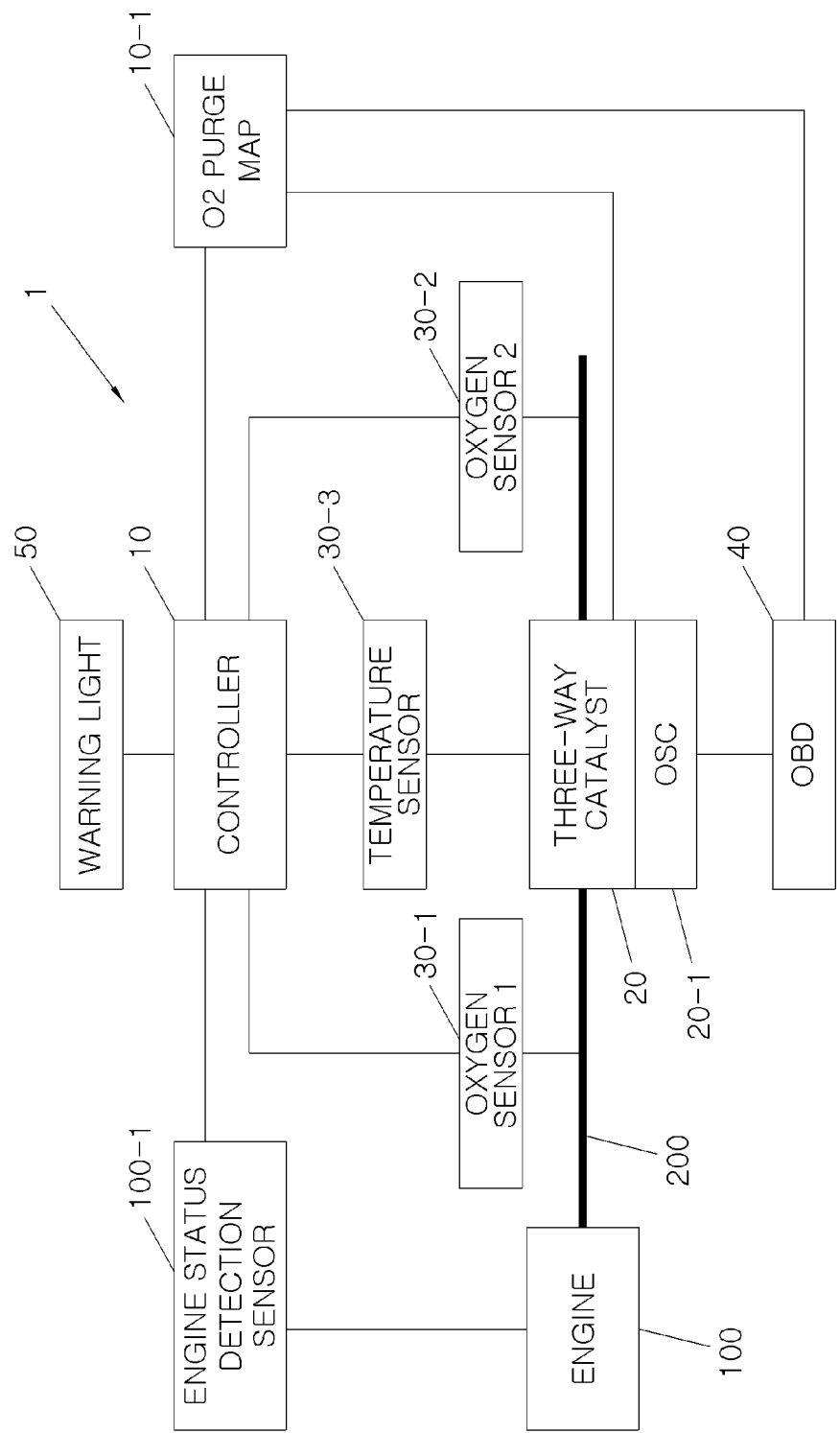

THREE WAY CATALYTIC CONTROL METHOD AND SYSTEM FOR DECREASING FUEL CONSUMPTION AND VEHICLE HAVING THE SAME

CROSS-REFERENCE TO RELATED APPLICATIONS

This application claims priority to Korean Patent Application No. 10-2015-0175687, filed on Dec. 10, 2015, the disclosure of which is incorporated herein by reference in its entirety.

BACKGROUND

Field of the Invention

The present invention relates to three-way catalytic control, and more particularly, to a three-way catalytic control method and system for decreasing fuel consumption by oxygen gas ($O_2$) purge control of the three way catalyst and a vehicle having the same.

Description of the Related Art

In general, exhaust emission and environmental regulations require reduction of pollution control materials such as nitrogen oxide (NOx), carbon monoxide/hydrocarbons (CO/HC) and the like, and thus vehicles are equipped with a catalyst such as Diesel Oxidation Catalyst (DOC), Catalyzed Particulate Filter (CPF), Selective Catalyst Reduction (SCR), Three Way Catalyst (TWC) and the like.

A three-way catalyst, inter alia, is useful in gasoline engines since such catalyst embodied with precious metals (e.g., Pt/Rh, PD/Rh, or Pt/Pd/Rh based metals) can participate in both oxidation of CO and HC and reduction of NOx and when an oxygen storage capacity material (hereinafter, the "OSC") is added thereto, improve performance of purifying CO, HC, and NOx. As an example, the three-way catalyst applied to gasoline engines, which may be classified as a new product, a deteriorated product, and On Board Diagnosis (OBD) based on oxygen concentration content of OSC, is adjusted by an $O_2$ closed-loop control which is executed in connection with an oxygen detection amount of an oxygen sensor (hereinafter, the "$O_2$ sensor"), and increases CO, HC oxidation performance on condition of high oxygen concentration content of OSC and improves NOx reduction performance on condition of low oxygen concentration content of OSC.

Particularly, the new product stands for an unused three-way catalyst under the state that activity of precious metals is high and an oxygen storage amount of OSC is high, the deteriorated product stands for an used three-way catalyst in which deterioration of the catalyst has occurred, and the OBD stands for a catalyst used for an extended period of time, in which an oxygen storage amount of OSC defined as a set value of OBD is detected upon OBD monitoring. Therefore, the oxygen storage amounts of OSC increase in the order of a new product>a deteriorated product>OBD while time periods for $O_2$ closed-loop control also increase in the order of a new product>a deteriorated product>OBD. The symbol ">" is an inequality sign indicating the magnitude relationship between two values.

Therefore, the $O_2$ closed-loop control for the three-way catalyst realizes increasing NOx purification performance after fuel-cut of gasoline engines under which a low oxygen atmosphere (hereinafter, the "LEAN") is converted into a temporary high oxygen atmosphere (hereinafter, the "RICH"). Particularly, the fuel-cut is executed at a section of decreasing speed and the like to improve fuel economy.

However, since the $O_2$ closed-loop control for the three-way catalyst is performed based on an oxygen detection amount of the $O_2$ sensor, a control time period must be used to which characteristics of the three-way catalyst having optimum performance or the relatively highest oxygen detection amount are not reflected.

For example, when the three-way catalyst is a new product, its characteristic is that since activity of precious metals in the new product is excellent, NOx may be sufficiently removed through reaction of the precious metals even though oxygen storage amount of OSC is high. Therefore, a control manner that increases a control time period for $O_2$ closed-loop control to be greater in a new product than that in a deteriorated product simply stands for increasing only the time period during which oxygen stored in OSC of the new product is removed, without contributing to NOx reduction.

In particular, the $O_2$ closed-loop control increases fuel consumption amount such that the atmosphere in combustion chambers is converted from LEAN to RICH. Accordingly, increase of the time period for the $O_2$ closed-loop control in gasoline engines of vehicles equipped with a new product leads to an increase of fuel consumption, and thus the $O_2$ closed-loop control leads to reduction of fuel economy contrary to fuel-cut and in turn the reduction of fuel economy is difficult to meet the enforced environmental control requirements.

SUMMARY

Therefore, the present invention provides a vehicle of which fuel economy is improved by virtue of reduction of fuel amount to be consumed after fuel-cut by operating a three-way catalytic control system, wherein the system distinguishes the three-way catalyst as a new product for which $O_2$ closed-loop control is performed for a time period calculated based on a predetermined amount of OSC and a deteriorated product for which $O_2$ closed-loop control is performed for a time period calculated based on a detection amount of $O_2$ sensor in consideration of deterioration of the catalyst; applies the time period for the new product, in which improvement of reduction of NOx owing to removal of oxygen is insignificant, to be less than or equal to that for the deteriorated product; and particularly, performs the $O_2$ closed-loop control in consideration of the new product on the preferential basis.

Other objects and advantages of the present invention may be understood by the following description, and become apparent with reference to the exemplary embodiments of the present invention. Also, it is obvious to those skilled in the art to which the present invention pertains that the objects and advantages of the present invention may be realized by the means as claimed and combinations thereof.

In accordance with one aspect of the present invention for achieving the above object, the present invention provides a three-way catalytic control method for reducing fuel consumption that may include: determining, by a controller, whether Oxygen Storage Capacity (OSC) of the three-way catalyst is under the condition of increasing oxygen, when a condition of performing $O_2$ purge control for the three-way catalyst is detected; performing the $O_2$ purge control, by the controller, by applying a predetermined $O_2$ purge time period to which a set initial value of oxygen of OSC is applied, when the OSC is not under the condition of increasing oxygen, but a calculated $O_2$ purge time period which is greater than the predetermined $O_2$ purge time period by applying an oxygen increase amount of OSC to the set initial value of oxygen of OSC, when the OSC is under the condition of increasing oxygen; and performing the $O_2$ purge control, by the controller, by applying an $O_2$ purge time period for a deteriorated product based on an oxygen sensor or an $O_2$ purge time period for On Board Diagnosis (OBD), when an increase amount of the calculated $O_2$ purge time period is equal to or greater than the $O_2$ purge time period for the deteriorated product during the $O_2$ purge control.

In an exemplary embodiment, the condition of increasing oxygen of OSC may be determined based on cycle variation of signal generated by the oxygen sensor disposed at a rear end side of the three-way catalyst and the frequency number that temperature of the catalyst, detected by a temperature sensor disposed in the three-way catalyst, exceeds a specific temperature. In addition, the set initial value (A) of oxygen of OSC may be greater than a predetermined amount of oxygen of OSC, in which OBD is reflected, for OBD monitoring of the three-way catalyst while less than an oxygen storage amount of OSC in a deteriorated product due to deterioration of the three-way catalyst.

The oxygen increase amount of OSC (b-1) detects $O_2$ purge time period (x) reflecting deterioration based on the condition of increasing oxygen of OSC, (b-2) calculates an oxygen increase amount (B) of OSC, to which the $O_2$ purge time period (x) reflecting deterioration is applied, (b-3) calculates the current oxygen storage value (K) of OSC, to which the oxygen increase amount (B) of OSC is applied, (b-4) compares an oxygen storage value (D) of OSC in a deteriorated product with the current oxygen storage value (K) of OSC during an $O_2$ purge time period (a) for a new product, an $O_2$ purge time period (b) for a deteriorated product, and an $O_2$ purge time period (c) for OBD, the new product and the deteriorated product indicating a degree of deterioration of the three-way catalyst, and (b-5) calculates the $O_2$ purge time period using the current oxygen storage value (K) of OSC when the current oxygen storage value (K) of OSC is less than the oxygen storage value (D) of OSC in the deteriorated product, wherein (b-5) when the condition that the $O_2$ purge time period (x) reflecting deterioration is greater than the $O_2$ purge time period (b) for the deteriorated product and less than the $O_2$ purge time period (a) for the new product is not satisfied, or the current oxygen storage value (K) of OSC is greater than the oxygen storage value (D) of OSC in the deteriorated product and thus is applied to the oxygen storage value (D) of OSC in the deteriorated product, the $O_2$ purge time period (x) reflecting deterioration may be compared with the $O_2$ purge time period (c) for OBD and then the $O_2$ purge time period for the deteriorated product or the $O_2$ purge time period for OBD may be applied.

Additionally, the $O_2$ purge time period (x) reflecting deterioration may be less than the $O_2$ purge time period (a) for the new product and greater than the $O_2$ purge time period (b) for the deteriorated product. The oxygen increase amount (B) of OSC may be defined as B, $B=(x-b)/(a-b)*A$, wherein a is $O_2$ purge time period for the new product, b is $O_2$ purge time period for the deteriorated product, and A is a set initial value of oxygen of OSC. The current oxygen storage value (K) of OSC may be a value obtained by adding the set initial value (A) of oxygen of OSC to the oxygen increase amount (B) of OSC. When the current oxygen storage value (K) of OSC is greater than the oxygen storage value (D) of OSC, it may be applied as the oxygen storage value (D) of OSC in the deteriorated product. The $O_2$ purge time period for the deteriorated product may be applied when the condition that the $O_2$ purge time period (x) reflecting deterioration is greater than the $O_2$ purge time period (c) for OBD and less than the $O_2$ purge time period (b) for the deteriorated product is satisfied.

In an exemplary embodiment, the calculated $O_2$ purge time period may be less than or equal to the $O_2$ purge time period for the deteriorated product, while the $O_2$ purge time period for the deteriorated product may be greater than the $O_2$ purge time period (c) for OBD. The $O_2$ purge control may be performed when the engine is idling after fuel-cut. When the $O_2$ purge time period for OBD is applied, a warning light may be turned on.

In accordance with another aspect of the present invention for achieving the above object, the present invention provides a three-way catalytic control system that may include an $O_2$ purge map that allows $O_2$ purge control for the three-way catalyst to apply a predetermined $O_2$ purge time period to which a set initial value (A) of oxygen of OSC is applied, when the OSC is not under the condition of increasing oxygen; to apply a calculated $O_2$ purge time period which may be greater than the predetermined $O_2$ purge time period by applying an oxygen increase amount of OSC to the set initial value (A) of oxygen of OSC, when the OSC is under the condition of increasing oxygen; and to apply an $O_2$ purge time period for a deteriorated product based on an oxygen sensor or an $O_2$ purge time period for OBD, when an increase amount of the calculated $O_2$ purge time period is equal to or greater than the $O_2$ purge time period for the deteriorated product, wherein the $O_2$ purge map may be established as map data of information of oxygen storage of OSC based on a degree of deterioration of the three-way catalyst.

In accordance with still another aspect of the present invention for achieving the above object, the present invention provides a vehicle that may include a three-way catalytic control system in which $O_2$ purge control for a three-way catalyst may apply a predetermined $O_2$ purge time period to which a set initial value (A) of oxygen of OSC (Oxygen Storage Capacity) is applied, when the OSC is not under a condition of increasing oxygen; a calculated $O_2$ purge time period which may be greater than the predetermined $O_2$ purge time period by applying an oxygen increase amount of OSC to the set initial value (A) of oxygen of OSC, when the OSC is under the condition of increasing oxygen; and an $O_2$ purge time period for a deteriorated product based on an oxygen sensor or an $O_2$ purge time period for OBD, when an increase amount of the calculated $O_2$ purge time period is equal to or greater than the $O_2$ purge time period for the deteriorated product, wherein the three-way catalytic control system may be connected with exhaust pipes through which exhaust gas emitted from an engine flows. In addition, the engine may be a gasoline engine.

According to the present invention, since $O_2$ closed-loop control for a three-way catalyst reflects chemical properties of the three-way catalyst and accordingly adjusts $O_2$ closed-loop control time period for a new product having excellent performance to be equal to or less than that for a deteriorated product, a three-way catalytic control system and a vehicle having the same realize the following advantages and effects:

First, since $O_2$ closed-loop control does not perform insignificant removal of oxygen for a three-way catalyst of new product, efficiency of the $O_2$ closed-loop control is increased.

Second, since an oxygen storage amount of OSC stored in the three-way catalyst of new product is not reduced by the $O_2$ closed-loop control, performance of the three-way catalyst may be maintained for a longer period of time.

Third, $O_2$ closed-loop control may reduce control time period compared to prior art and thus, fuel consumption amount may be reduced.

Fourth, since fuel consumption amount may be reduced by the $O_2$ closed-loop control, gasoline engine vehicles equipped with a three-way catalyst of new product realizes improvement of fuel economy by the $O_2$ closed-loop control along with improvement of fuel economy by fuel-cut.

Fifth, since fuel economy of vehicles may be improved by the $O_2$ closed-loop control as well as the fuel-cut, such vehicles may more easily fulfill the enforced environmental regulations.

Sixth, vehicles to which the present invention is applied may fulfill the enhanced environmental regulations and thus, may improve merchantability and obtain market advantage.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which:

FIGS. 1A, 1B and 1C are a flow chart of a three-way catalytic control method for reducing fuel consumption in accordance with an exemplary embodiment of the present invention;

FIG. 2 is a block diagram of a three-way catalytic control system in a vehicle, in which a three-way catalytic control method for reducing fuel consumption in accordance with an exemplary embodiment of the present invention is implemented;

DETAILED DESCRIPTION

Figure 1B:
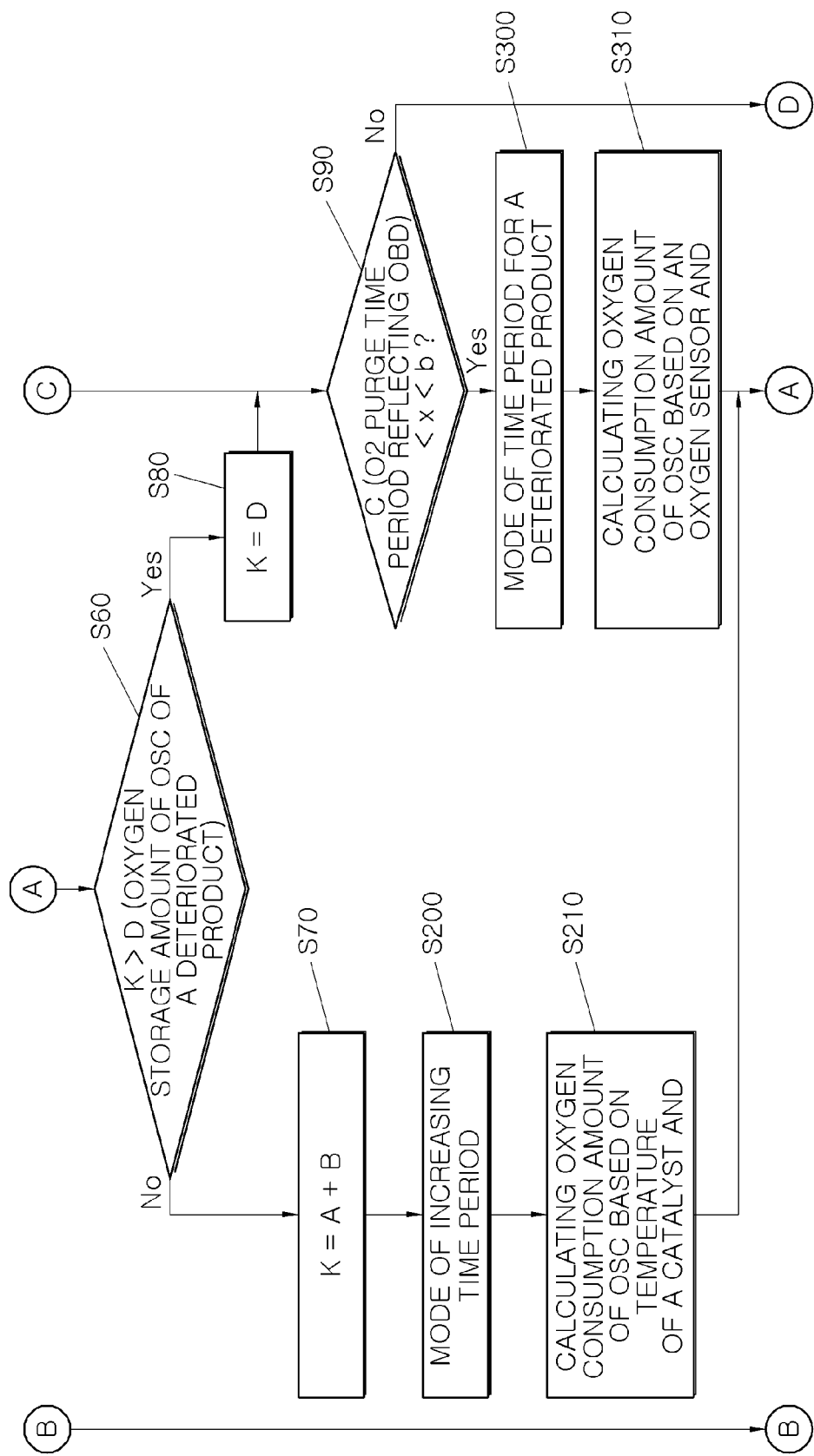

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Additional objects, advantages, and features of the invention will be more apparent to those of ordinary skill in the relevant art in view of the following detailed description of exemplary embodiments and the accompanying drawings. If it is determined that detailed description of known relevant technologies may unnecessarily obscure the gist of the present invention in the description thereof, the detailed description thereof will be omitted. In addition, the thickness of each line or the size of each component illustrated in the drawings may be exaggerated for convenience of description and clarity. Moreover, terms to be described later are terms defined in consideration of functions of the present invention, and these may vary with the intention or practice of a user or an operator. Therefore, such terms should be defined based on the entire content disclosed herein.

Reference will now be made in detail to exemplary embodiments, examples of which are illustrated in the accompanying drawings.

FIGS. 1A, 1B and 1C illustrate a flow chart of a three-way catalytic control method for reducing fuel consumption in accordance with an exemplary embodiment of the present invention. As shown, a three-way catalytic control method for a gasoline engine vehicle, which may be executed after fuel-cut, is characterized in that the method considers that oxygen storage amount of OSC of the three-way catalyst increases in the order of a new product>a deterioration products>OBD; distinguishes $O_2$ closed-loop control into a mode being applied to new product, which is not connected with $O_2$ sensor, a mode being applied to a deteriorated product, which may be connected with $O_2$ sensor, and a mode being applied to OBD, which relies on OBD monitoring; and accordingly, applies $O_2$ closed-loop control time period to be greater in the order of a deteriorated product>a new product>OBD, or a deteriorated product=a new product>OBD, so that excellent chemical properties of a three-way catalyst of new product may be reflected to the control. Herein, symbols ">" and "=" are inequality and equal signs and indicate the magnitude relationship between two values respectively.

Meanwhile, FIG. 2 is a block diagram of a three-way catalytic control system, which is applied to a vehicle. As shown, the three-way catalyst control system 1 may include a controller 10; a three-way catalyst 20 having OSC 20-1 and may be installed in an exhaust pipe 200 through which exhaust gas discharged from a gasoline engine 100 flows; sensors 30-1, 30-2, and 30-3; an OBD 40 configured to monitor whether an oxygen storage amount in the OSC 20-1 is lowered to a set value of OBD; and a warning lamp 50. The controller 10 may be configured to operate the other components of the system.

Specifically, the controller 10 may include an $O_2$ purge map 10-1. The controller 10 may consider information of the engine 100 (e.g., amount of intake air flowing in combustion chambers, coolant temperature, intake/exhaust valve timing, top/bottom dead center of pistons, hydraulic pressure of engine oil, engine revolution per minute (rpm), start and end of fuel-cut), which is detected by an engine state detection sensor 100-1, as input data. In addition, the controller 10 may consider information regarding the OBD 40 for detecting whether the oxygen storage amount of OSC 20-1 is decreased to the set value of OBD by monitoring the oxygen storage amount, as input data. Accordingly, the controller 10 may be an electronic control unit (ECU) for an engine.

The $O_2$ purge map 10-1 establishes a map in which oxygen storage capacity of OSC 20-1 may be distinguished into a set initial value of oxygen of OSC, an oxygen storage amount of OSC of a deteriorated product based on the progress of deterioration, and a predetermined oxygen storage amount of OSC for OBD monitoring, and may be connected with the controller 10. That is, the map may be stored within the memory of the controller. In particular, the $O_2$ purge map 10-1 may provide information regarding the OBD 40 for detecting whether the oxygen storage amount of OSC 20-1 is decreased to the set value of OBD by monitoring oxygen storage of OSC 20-1, as input data.

Specifically, the sensors 30-1, 30-2, and 30-3 may include a catalyst front end oxygen sensor 30-1 configured to detect oxygen in exhaust gas flowing into the three-way catalyst 20 at the front end of the three-way catalyst 20, a catalyst rear end oxygen sensor 30-2 configured to detect oxygen in exhaust gas discharging from the three-way catalyst 20 at the rear end of the three-way catalyst 20, and a catalyst temperature sensor 30-3 configured to detect temperature of the three-way catalyst 20, respectively. Detection values of the catalyst front end/rear end oxygen sensors 30-1 and 30-2 and the catalyst temperature sensor 30-3 may be provided as input data for the $O_2$ purge map 10-1 or the controller 10. Additionally, the warning lamp 50 may be turned on according to control of the $O_2$ purge map 10-1 or the controller 10 which takes the set value of OBD detected by the OBD 40 as input data, and outputs a warning regarding the oxygen storage state in the OSC 20-1 to the driver. Accordingly, the warning lamp 50 may include a lamp or a light emitting diode (LED).

Figure 3:
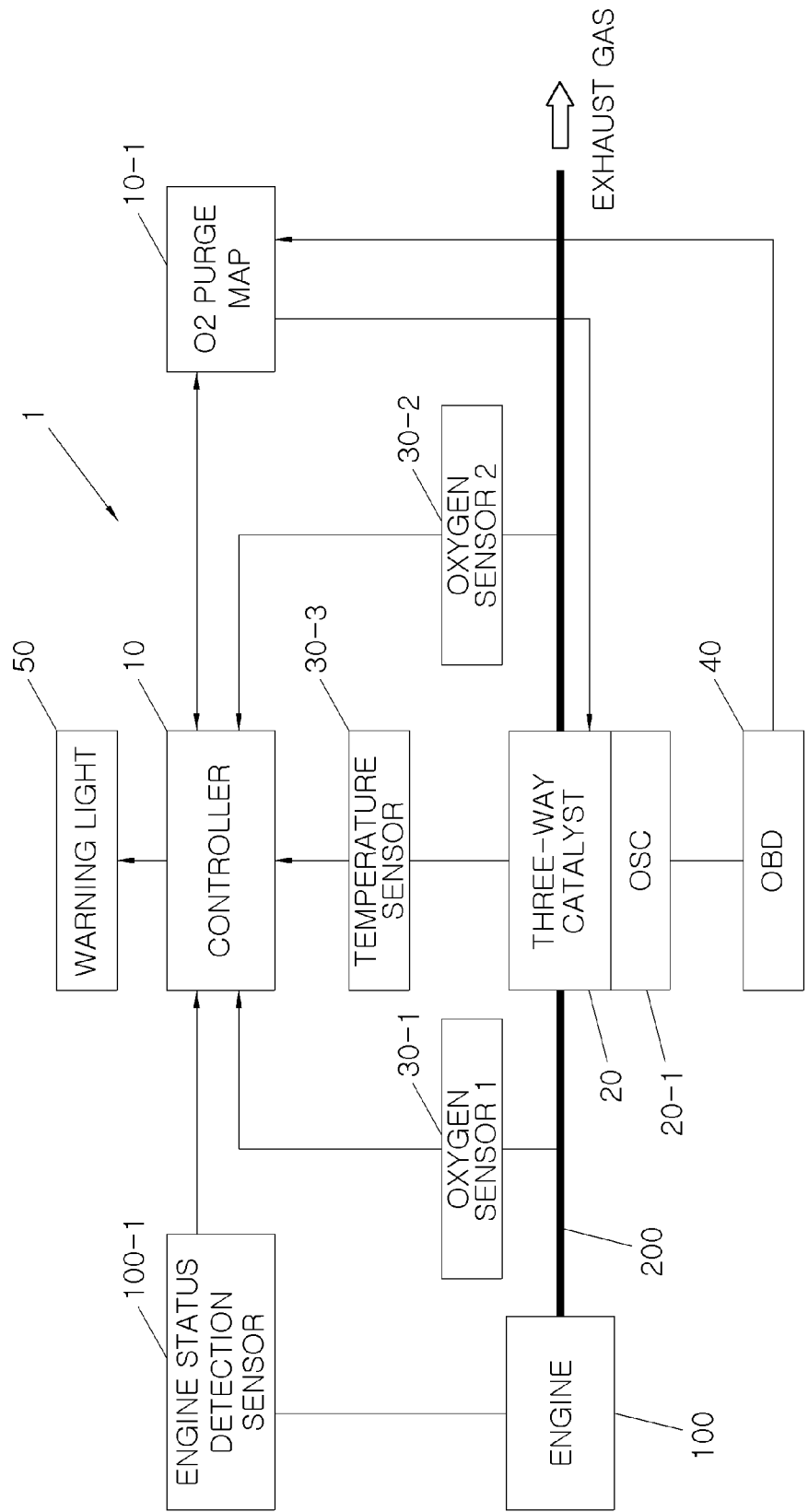
FIG. 3 is a diagram showing an example of operation which is operated by a three-way catalytic control system for reducing fuel consumption in accordance with an exemplary embodiment of the present invention.
Figure 4:
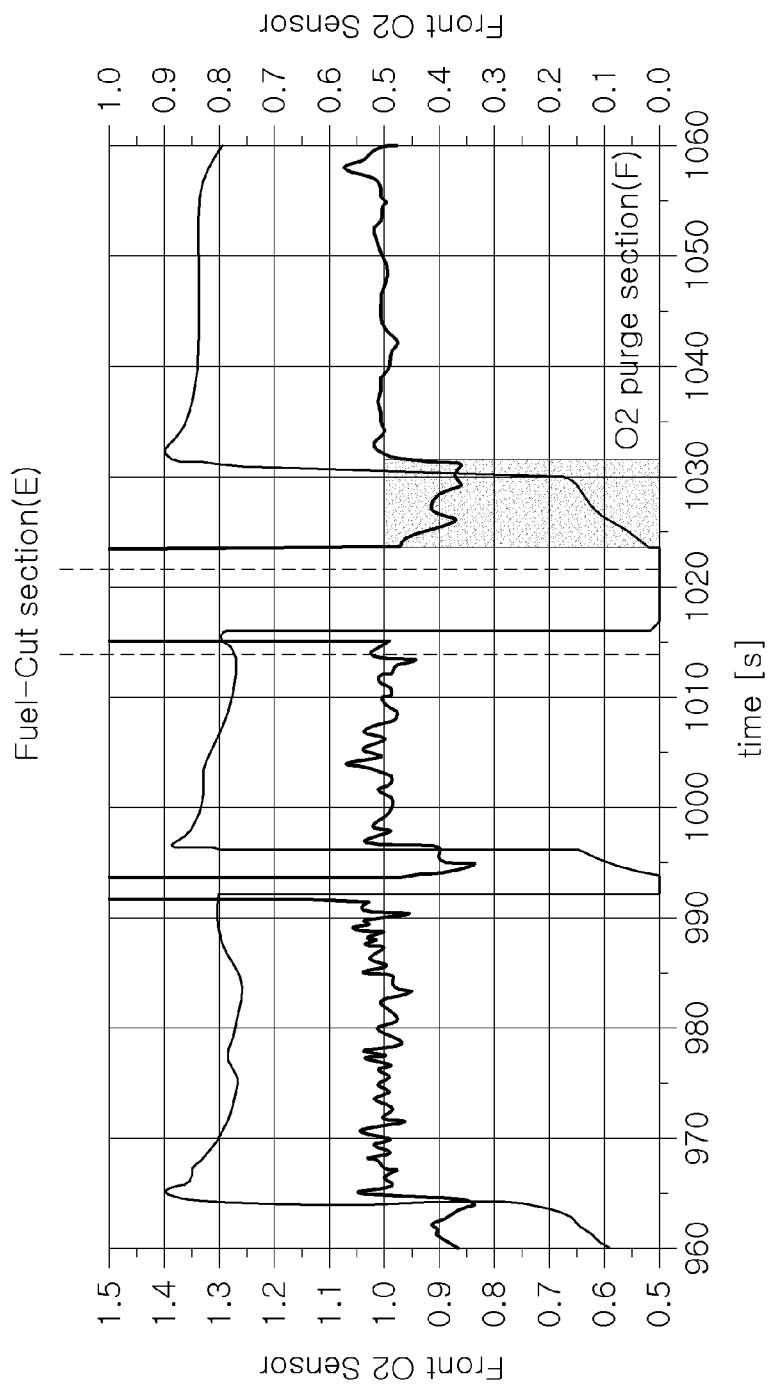
FIG. 4 is a graph illustrating a state that $O_2$ purge control time period for a three-way catalyst of new product is reduced after fuel-cut of engine in accordance with an exemplary embodiment of the present invention.

Hereinafter, an exemplary embodiment of a three-way catalytic control method for reducing fuel consumption in FIG. 1 is described in detail with reference to FIGS. 3 and 4. The method described below may be executed by the controller 10 connected with the $O_2$ purge map 10-1, and the controller 10 may be constituted by the ECU for an engine. In particular, signals and detection values of sensors may be those of the catalyst front end/rear end oxygen sensors 30-1 and 30-2, but those of the catalyst rear end oxygen sensor 30-2 are applied.

Step S1 is a step in which the controller 10 may be configured to detect that driving state of the vehicle enters a specific driving state. Referring to FIG. 3, the controller 10 may be configured to receive and consider information regarding the engine 100, detected by the engine condition detection sensor 100-1, as input data, and determine whether the vehicle enters a specific driving state. In particular, the specific driving state is a condition for engine idling after fuel-cut, which is a driving condition that compares signal variation of the catalyst rear end oxygen sensor 30-2. As a result, the controller 10 may be configured to distinguish a mode of reducing time period at S100, a mode of increasing time period at S200, a mode of time period for the deteriorated product at S300, and a mode of time period for OBD at S400.

Step S10 is a step in which the controller 10 may be configured to determine whether the three-way catalyst 20 is deteriorated. Referring to FIG. 3, the controller 10 may be configured to distinguish a mode of applying oxygen sensor, which uses detection values and the number of detection of oxygen concentration at the rear end of the three-way catalyst 20 by the catalyst rear end oxygen sensor 30-2, and a mode of applying temperature sensor, which uses detection values and the number of detection of the interior temperature of the three-way catalyst 20 by the catalyst temperature sensor 30-3, and may be configured to determine whether the three-way catalyst 20 is deteriorated at this point in time when any one of the mode of applying oxygen sensor and the mode of applying temperature sensor fulfills the required condition.

For example, in the mode of applying oxygen sensor, the controller 10 may be configured to detect whether variation cycle of detection values of the catalyst rear end oxygen sensor 30-2 is decreased. When the three-way catalyst 20 is deteriorated, variation cycle of detection values of the catalyst rear end oxygen sensor 30-2 may be reduced compared to that in a new product. In the mode of applying temperature sensor, the controller 10 may be configured to detect the frequency number of the time when detection values of the catalyst temperature sensor 30-3 exceed a specific temperature. When the temperature of the three-way catalyst 20 is equal to or greater than about 950° C., deterioration of the catalyst occurs.

Step S20 is a state in which the three-way catalyst 20 may be determined as not being deteriorated at S10. In particular, the controller 10 may be configured to apply the current oxygen storage value (K) of OSC as a set initial value (A) of oxygen of OSC and then proceeds to step S100 for a mode of reducing time period. On the other hand, when the three-way catalyst 20 is determined as having been deteriorated at S10, the controller 10 proceeds to step S30.

Step S30 is a step in which the controller 10 may be configured to determine whether the degree of deterioration of the three-way catalyst 20 corresponds to an initial state. Accordingly, the controller 10 may be configured to use $O_2$ purge time period (x) reflecting deterioration, $O_2$ purge time period (a) for the new product and $O_2$ purge time period (b) for the deteriorated product, apply a relation equation of b<x<a, and determine whether the initial state. In particular, the symbol "<" is an inequality sign indicating the magnitude relationship. Referring to FIG. 3, the controller 10 may be configured to import or access values of each of a, b and x from the $O_2$ purge map 10-1, compare the values with each other, and determine whether the initial state. The $O_2$ purge time period (a) for the new product indicates a predetermined $O_2$ purge time period for the new product, the $O_2$ purge time period (b) for the deteriorated product indicates a predetermined $O_2$ purge time period for the deteriorated product, and the $O_2$ purge time period (x) reflecting deterioration indicates a predetermined $O_2$ purge time period based on the degree of deterioration, wherein all of them are predetermined and established as a map in the $O_2$ purge map 10-1.

At step S30, when the $O_2$ purge time period (x) reflecting deterioration exists between the $O_2$ purge time period (a) for the new product and the $O_2$ purge time period (b) for the deteriorated product, the controller 10 may proceed to preprocessing procedures (S40 through S80) for the mode of increasing the time period at S200, but if not so, may proceed to a step S90. The preprocessing steps (S40 to S80) are as follows:

Step S40 is a step in which the controller 10 may be configured to estimate the oxygen increase amount (B) of OSC 20-1. Accordingly, the controller 10 may be configured to use the $O_2$ purge time period (x) reflecting deterioration, the $O_2$ purge time period (b) for the deteriorated product, and the set initial value of oxygen of OSC, and apply a relation equation of $B=(x-b)/(a-b)*A$. Therefore, the oxygen increase amount (B) of OSC may be calculated by dividing a difference between the $O_2$ purge time period (x) reflecting deterioration and the $O_2$ purge time period (b) for the deteriorated product by a value obtained by multiplying a difference between the $O_2$ purge time period (a) for the new product and the $O_2$ purge time period (b) for the deteriorated product by the set initial value (A) of oxygen of OSC.

Step S50 is a step in which controller 10 may be configured to estimate the current oxygen storage value (K) of OSC 20-1. Accordingly, the controller 10 may be configured to use the set initial value (A) of oxygen of OSC and the oxygen increase amount (B) of OSC, and apply a relation equation of $K=A+B$. Therefore, the current oxygen storage value (K) of OSC may be calculated by adding the set initial value (A) of oxygen of OSC to the oxygen increase amount (B) of OSC. Step S60 is a step in which controller 10 may be configured to distinguish the new product and the deteriorated product based on the current oxygen storage value (K) of OSC 20-1. Accordingly, the controller 10 may be configured to use the current oxygen storage value (K) of OSC and the oxygen storage value (D) of OSC in the deteriorated product, and apply a relation equation of $K>D$. The symbol ">" is an inequality sign indicating the magnitude relationship.

Step S70 is a step in which the current oxygen storage value (K) of OSC may be less than the oxygen storage value (D) of OSC in the deteriorated product, wherein the controller 10 may be configured to set the current oxygen storage value (K) of OSC as the sum of the set initial value (A) of oxygen of OSC and the oxygen increase amount of OSC and takes $K=A+B$, and then proceeds to step S200 for a mode of increasing the time period for the new product. Step S80 is a step in which the current oxygen storage value (K) of OSC may be greater than the oxygen storage value (D) of OSC in the deteriorated product, wherein the controller 10 may be configured to set the current oxygen storage value (K) of OSC as the oxygen storage value (D) of OSC in the deteriorated product and store $K=D$, and then proceeds to step S90.

Step S90 is a step of when the condition of $b<x<a$ does not fulfill at S30, or when $K=D$ at S80, wherein the controller 10 may be configured to determine whether deterioration of the three-way catalyst 20 is further aggravated. Accordingly, the controller 10 may be configured to use the $O_2$ purge time period (x) reflecting deterioration, the $O_2$ purge time period (b) for the deteriorated product, and the $O_2$ purge time period (c) reflecting OBD, apply a relation equation of $c<x<b$, and determine whether or not a severe state. The symbol "<" is an inequality sign indicating the magnitude relationship. Referring to FIG. 3, the controller 10 may be configured to import or access values of each of b, c and x from the $O_2$ purge map 10-1, compare the values with each other, and determine whether the initial state. In particular, the $O_2$ purge time period (c) reflecting OBD indicates the $O_2$ purge time period to which the oxygen storage amount of OSC 20-1 is classified and applied as the set value of OBD to be monitored at OBD 40, and may be predetermined and established as a map in the $O_2$ purge the map 10-1.

The results at S90 may be divided into a time mode for the deteriorated product at S300 and a time mode for OBD at S400. On the other hand, step S100 is a mode of reducing time period, in which the controller 10 may be configured to apply the condition of $K=A$ at S20 and then perform the $O_2$ purge control for the three-way catalyst 20. In particular, the set initial value (A) of oxygen of OSC may be greater than the oxygen set amount of OSC, in which OBD is reflected, for OBD monitoring of the three-way catalyst 20 while less than the oxygen storage amount of OSC in the deteriorated product due to deterioration of the three-way catalyst 20. When the three-way catalyst is a new product, activity of precious metals in the new product is excellent and thus, NOx may be sufficiently removed through reaction of the precious metals even though oxygen storage amount of OSC is high.

Specifically, the controller 10 proceeded to the mode of reducing time period may be configured to apply the $O_2$ purge time period set, as in S110, and perform the $O_2$ purge control with the set $O_2$ purge time period at S500. The result of the mode of reducing time period is illustrated in FIG. 4. As shown, an $O_2$ purge section (F) starting after a fuel-cut section (E) may be performed for about 6 seconds within a 10 second interval between about 1020 second and 1030 second.

Therefore, applying the $O_2$ purge time period to be longer in the order of a deteriorated product>a new product>OBD makes the $O_2$ purge time period for a three-way catalyst 20 of new product having excellent chemical properties less than that for the deteriorated product, removes disadvantages that an excessive $O_2$ purge control compared to that for the deteriorated product is nothing but removing oxygen stored in OSC 20-1 within the three-way catalyst and may not contribute largely to reduction of NOx, and also may improve fuel economy of the engine 100 by virtue of the short $O_2$ purge control.

On the other hand, the step S200 is a mode of increasing time period, in which the controller 10 may be configured to apply the condition of $K=A+B$ at S70 and perform the $O_2$ purge control for the three-way catalyst 20. In particular, the degree of increasing the $O_2$ purge time period may be increased by reflecting an increment of the oxygen storage amount of OSD by a shortened signal variation rate of the catalyst rear end oxygen sensor 30-2 under the condition of idling operation of the engine after fuel-cut, and the $O_2$ purge time period may be increased by reflecting an increment of the oxygen storage amount of the OSD by a degree of deterioration of the three-way catalyst 20, which is aggravated under the condition of high temperature.

Specifically, the controller 10 proceeded to the mode of increasing time period may be configured to calculate, as in S210, an oxygen consumption amount of OSC based on temperature of the three-way catalyst 20 and an amount of intake air the engine 100 and also a $O_2$ purge time period for the three-way catalyst 20 by applying the calculated oxygen consumption amount of OSC, and then may be configured to perform the $O_2$ purge control with the calculated $O_2$ purge time period at S500. As a result, the $O_2$ purge control time period may be greater than that in the mode of reducing the time period. However, applying the $O_2$ purge control time period to be longer in the order of a deteriorated product>a new product>OBD or a deteriorated product=a new product>OBD may still improve fuel economy even though the degree of improvement is inferior compared to that in the mode of reducing the time period. In particular, in the mode of increasing the time period, the $O_2$ purge control time period may increase as the deterioration of the three-way catalyst 20 is progressively aggravated based on increase of the driving distance of a vehicle, and after a specific time period, the mode may be switched to a mode of time period for the deteriorated product at S300 in which the $O_2$ purge time period relying on the calculated amount of the OSD becomes the same as the $O_2$ purge time period relying on the variation of the catalyst rear end oxygen sensor 30-2.

Further, the mode of time period for the deteriorated product at S300 is a case fulfilling the condition at S90 that the $O_2$ purge time period (x) reflecting deterioration is greater than the $O_2$ purge time period (c) reflecting OBD but less than the $O_2$ purge time period (b) for the deteriorated product. The controller 10 proceeded to the mode of time period for the deteriorated product may be configured to calculate, as in S310, an oxygen consumption amount of OSC by applying the detection value of the oxygen sensor and also a $O_2$ purge time period for the three-way catalyst 20 by applying the calculated oxygen consumption amount of OSC, and then may be configured to perform the $O_2$ purge control with the calculated $O_2$ purge time period at S500.

The mode of time period for OBD at S400 is a case that the condition at S90 that the $O_2$ purge time period (x) reflecting deterioration is greater than the $O_2$ purge time period (c) reflecting OBD but less than the $O_2$ purge time period (b) for the deteriorated product is not fulfilled. Specifically, the controller 10 proceeded to the mode of time period for OBD, as in S410, may be configured to turn on the warning lamp 50 and provide the driver with the status of the three-way catalyst 20, and perform the $O_2$ purge control by applying the $O_2$ purge time period (c) reflecting OBD at S500.

As discussed above, the three-way catalytic control method according to the embodiment may be executed by the controller 10 having the $O_2$ purge map 20-1, wherein the controller 10 may be configured to perform $O_2$ purge control for the three-way catalyst 20 by applying: a predetermined $O_2$ purge time period to which a set initial value (A) of oxygen of OSC is applied, when the OSC 20-1 is not under the condition of increasing oxygen; a calculated $O_2$ purge time period greater than the predetermined $O_2$ purge time period by applying an oxygen increase amount of OSC to the set initial value (A) of oxygen of OSC, when the OSC is under the condition of increasing oxygen; and an $O_2$ purge time period for a deteriorated product based on an oxygen sensor, or an $O_2$ purge time period for OBD (On Board Diagnosis), when an increase amount of the calculated $O_2$ purge time period is equal to or greater than the $O_2$ purge time period for the deteriorated product, and thus, it may be possible to apply the time period for the new product, in which improvement of reduction of NOx owing to removal of oxygen is insignificant, to be less than or equal to that for the deteriorated product. In particular, a three-way catalytic control system, which is operated by the $O_2$ closed-loop control in consideration of the new product may be applied to a vehicle to improve fuel economy by virtue of reduction of fuel amount to be consumed after fuel-cut.

While the present invention has been described with respect to the specific exemplary embodiments, it will be apparent to those skilled in the art that various changes and modifications may be made without departing from the spirit and scope of the invention as defined in the following claims.

What is claimed is:

1. A three-way catalytic control method for reducing fuel consumption, comprising:
    determining, by a controller, whether Oxygen Storage Capacity (OSC) of the three-way catalyst is under a condition of increasing oxygen, when a condition of performing oxygen gas ($O_2$) purge control for the three-way catalyst is detected;
    performing the $O_2$ purge control, by the controller, by applying a predetermined $O_2$ purge time period to which a set initial value (A) of oxygen of OSC is applied, when the OSC is not under the condition of increasing oxygen, and a calculated $O_2$ purge time period which is greater than the predetermined $O_2$ purge time period by applying an oxygen increase amount of OSC to the set initial value (A) of oxygen of OSC, when the OSC is under the condition of increasing oxygen; and
    performing the $O_2$ purge control, by the controller, by applying an $O_2$ purge time period for a deteriorated product based on an oxygen sensor or an $O_2$ purge time period for On Board Diagnosis (OBD), when an increase amount of the calculated $O_2$ purge time period is equal to or greater than the $O_2$ purge time period for the deteriorated product during the $O_2$ purge control.

2. The method of claim 1, wherein the condition of increasing oxygen of OSC is determined based on cycle variation of signal generated by the oxygen sensor disposed at a rear end side of the three-way catalyst and a frequency number that temperature of the catalyst, detected by a temperature sensor disposed in the three-way catalyst, exceeds a specific temperature.

3. The method of claim 1, wherein the set initial value (A) of oxygen of OSC is greater than a predetermined amount of oxygen of OSC, in which OBD is reflected, for OBD monitoring of the three-way catalyst and less than an oxygen storage amount of OSC in a deteriorated product due to deterioration of the three-way catalyst.

4. The method of claim 1, wherein the oxygen increase amount of OSC detects $O_2$ purge time period (x) reflecting deterioration based on the condition of increasing oxygen of OSC, calculates an oxygen increase amount (B) of OSC, to which the $O_2$ purge time period (x) reflecting deterioration is applied, calculates the current oxygen storage value (K) of OSC, to which the oxygen increase amount (B) of OSC is applied, compares an oxygen storage value (D) of OSC in a deteriorated product with the current oxygen storage value (K) of OSC during an $O_2$ purge time period (a) for a new product, an $O_2$ purge time period (b) for a deteriorated product, and an $O_2$ purge time period (c) for OBD, the new product and the deteriorated product indicating a degree of deterioration of the three-way catalyst, and calculates the $O_2$ purge time period using the current oxygen storage value (K)

of OSC when the current oxygen storage value (K) of OSC is less than the oxygen storage value (D) of OSC in the deteriorated product.

5. The method of claim 4, wherein the O$_2$ purge time period (x) reflecting deterioration is less than the O$_2$ purge time period (a) for the new product and greater than the O$_2$ purge time period (b) for the deteriorated product.

6. The method of claim 4, wherein the increase amount (B) of oxygen of OSC is defined as B, B=(x−b)/(a−b)*A, wherein a is O$_2$ purge time period for the new product, b is O$_2$ purge time period for the deteriorated product, and A is a set initial value of oxygen of OSC.

7. The method of claim 4, wherein the current oxygen storage value (K) of OSC is a value obtained by adding the set initial value (A) of oxygen of OSC to the oxygen increase amount (B) of OSC.

8. The method of claim 4, wherein when the current oxygen storage value (K) of OSC is greater than the oxygen storage value (D) of OSC in the deteriorated product, the current oxygen storage value (K) is applied as the oxygen storage value (D) of OSC in the deteriorated product.

9. The method of claim 4, wherein when the condition that the O$_2$ purge time period (x) reflecting deterioration is greater than the O$_2$ purge time period (b) for the deteriorated product and shorter than the O$_2$ purge time period (a) for the new product is not satisfied, or the current oxygen storage value (K) of OSC is greater than the oxygen storage value (D) of OSC in the deteriorated product and thus is applied to the oxygen storage value (D) of OSC in the deteriorated product, the O$_2$ purge time period (x) reflecting deterioration is compared with the O$_2$ purge time period (c) for OBD and then the O$_2$ purge time period for the deteriorated product or the O$_2$ purge time period for OBD is applied.

10. The method of claim 9, wherein the O$_2$ purge time period for the deteriorated product is applied when the condition that the O$_2$ purge time period (x) reflecting deterioration is greater than the O$_2$ purge time period (c) for OBD and less than the O$_2$ purge time period (b) for the deteriorated product is satisfied.

11. The method of claim 1, wherein the calculated O$_2$ purge time period is less than or equal to the O$_2$ purge time period for the deteriorated product, while the O$_2$ purge time period for the deteriorated product is greater than the O$_2$ purge time period (c) for OBD.

12. The method of claim 1, wherein the O$_2$ purge control is performed when engine is idling after fuel-cut.

13. The method of claim 1, wherein when the O$_2$ purge time period for OBD is applied, a warning light is turned on.

14. A three-way catalytic control system, comprising:
a controller including an oxygen gas (O$_2$) purge map allowing O$_2$ purge control for a three-way catalyst to apply a predetermined O$_2$ purge time period to which a set initial value (A) of oxygen of OSC (Oxygen Storage Capacity) is applied, when the OSC is not under the condition of increasing oxygen; to apply a calculated O$_2$ purge time period greater than the predetermined O$_2$ purge time period by applying an oxygen increase amount of OSC to the set initial value (A) of oxygen of OSC, when the OSC is under the condition of increasing oxygen; and to apply an O$_2$ purge time period for a deteriorated product based on an oxygen sensor or an O$_2$ purge time period for On Board Diagnosis (OBD), when an increase amount of the calculated O$_2$ purge time period is equal to or greater than the O$_2$ purge time period for the deteriorated product,
wherein the O$_2$ purge map is established as map data of information regarding oxygen storage of OSC based on a degree of deterioration of the three-way catalyst.

15. A vehicle, comprising:
a three-way catalytic control system in which oxygen gas (O$_2$) purge control for a three-way catalyst applies:
a predetermined O$_2$ purge time period to which a set initial value (A) of oxygen of Oxygen Storage Capacity (OSC) is applied, when the OSC is not under the condition of increasing oxygen;
a calculated O$_2$ purge time period which is greater than the predetermined O$_2$ purge time period by applying an oxygen increase amount of OSC to the set initial value (A) of oxygen of OSC, when the OSC is under the condition of increasing oxygen; and
an O$_2$ purge time period for a deteriorated product based on an oxygen sensor or an O$_2$ purge time period for On Board Diagnosis (OBD), when an increase amount of the calculated O$_2$ purge time period is equal to or greater than the O$_2$ purge time period for the deteriorated product,
wherein the three-way catalytic control system is connected with exhaust pipes through which exhaust gas emitted from an engine flows.

16. The vehicle of claim 15, wherein the engine is a gasoline engine.

* * * * *